(No Model.)

F. H. RICHARDS.
WEIGHING MACHINE.

No. 589,283.

6 Sheets—Sheet 1.

Patented Aug. 31, 1897.

Witnesses:
C. H. Wheaton
Fred. J. Dole.

Inventor:
F. H. Richards (No Model.)
6 Sheets—Sheet 3.

F. H. RICHARDS.
WEIGHING MACHINE.

No. 589,283.  Patented Aug. 31, 1897.

Witnesses:
C. M. Wheaton
Fred. J. Dole

Inventor:
F. H. Richards (No Model.)

6 Sheets—Sheet 4.

F. H. RICHARDS.
WEIGHING MACHINE.

No. 589,283.

Patented Aug. 31, 1897.

Witnesses:
C. M. Wheaton
Fred. J. Dole.

Inventor:
F. H. Richards.

(No Model.)  F. H. RICHARDS.  6 Sheets—Sheet 5.
WEIGHING MACHINE.
No. 589,283.  Patented Aug. 31, 1897.
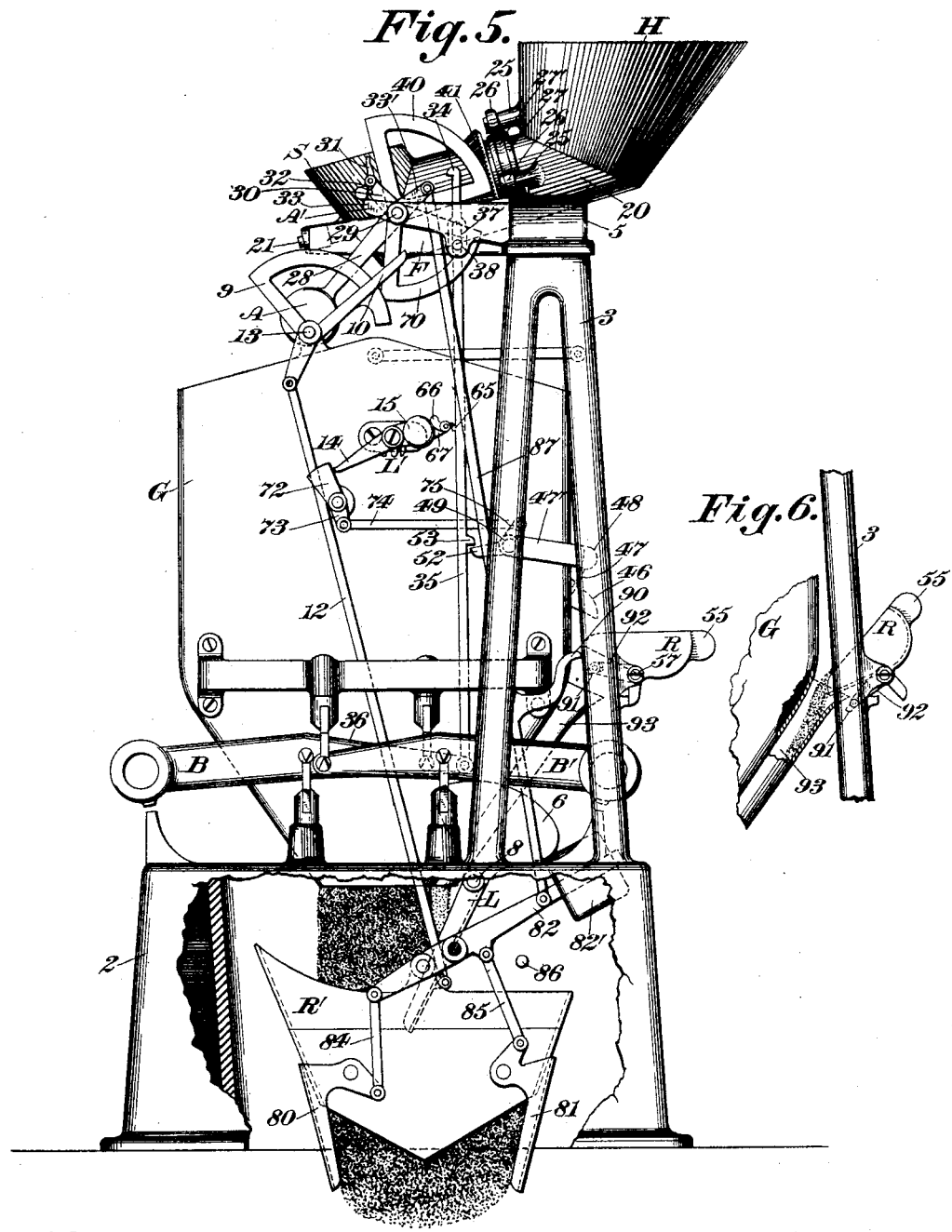
Witnesses:  Inventor:

(No Model.)

F. H. RICHARDS.
WEIGHING MACHINE.

No. 589,283.   Patented Aug. 31, 1897.

Witnesses:
O. W. Wheaton.
Fred. J. Dole.

Inventor:
F. H. Richards,

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,283, dated August 31, 1897.

Application filed February 10, 1897. Serial No. 622,801. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various classes of granular and like materials with rapidity and precision, it being an improvement upon the invention set forth in Letters Patent No. 572,067, granted to me November 24, 1896.

With respect to one of its features the invention comprehends the provision of stream-controlling mechanism embodying in its organization a cut-off spout, which in the present instance consists of a tubular turning elbow, the action of which is preferably controlled by the weighing mechanism and which communicates with a suitable source of supply, such as a hopper, so that when said spout is turned in one direction or advanced it is adapted to deliver a stream of material to the load-receiver, and when turned in the opposite direction or retracted it will stop or arrest the supply, thereby obviating the employment of a valve.

Another object of the invention is to provide efficient overloading and load-reducing means that are preferably operative in this order during the weighing of a load, the same coöperating to insure the obtainment of an accurate load in a minimum period of time.

Another object of the invention is to furnish a regulator for receiving the loads intermittingly discharged from the load-receiver, said regulator consisting in the present case of a valved hopper, so that by reason of the valves the hopper is made to retain a comparatively large amount of material to assure its depression, such hopper preferably furnishing the necessary power to effect the operation of the stream-controller on one of the strokes of the former.

Figure 1:
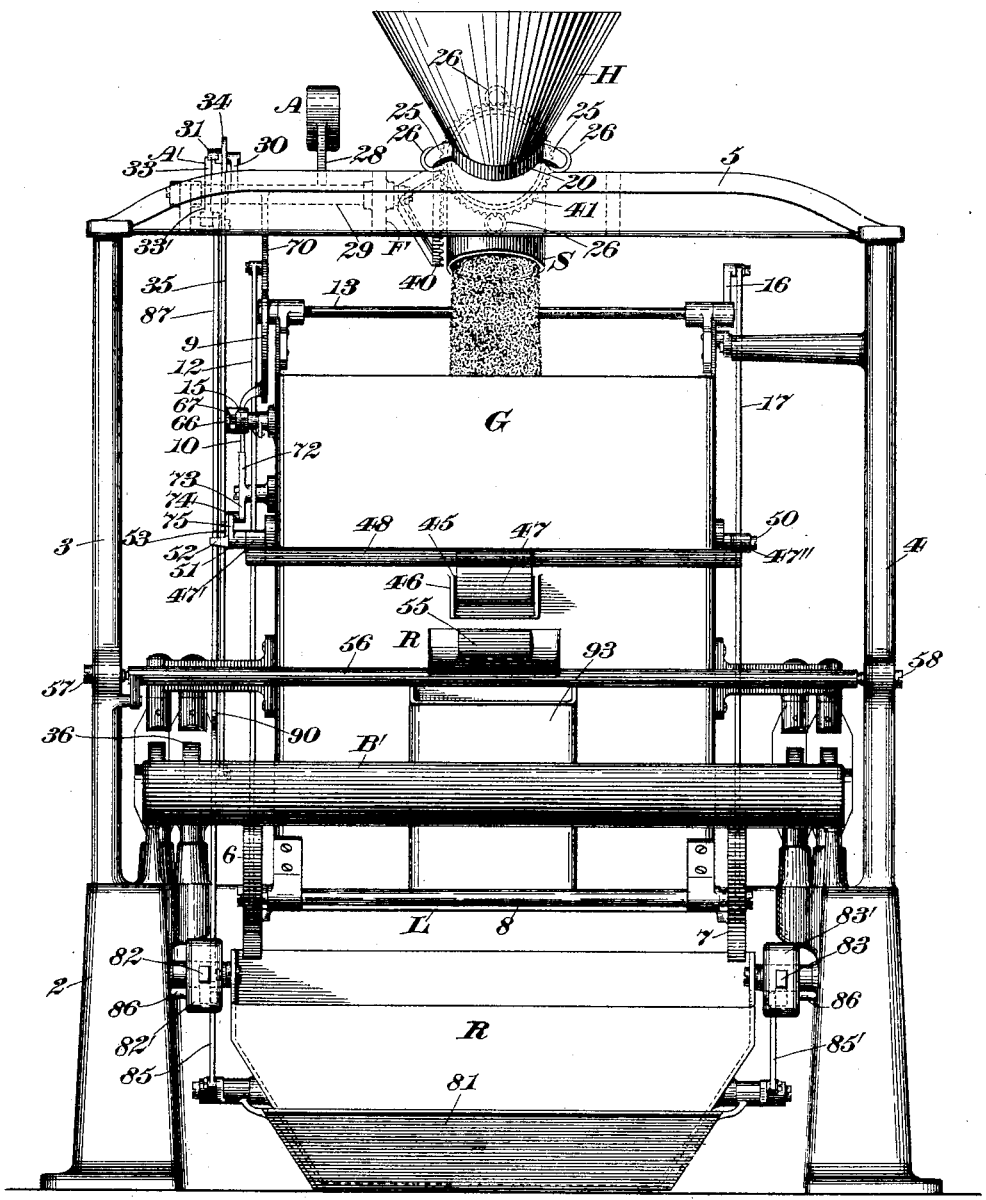
Figure 2:
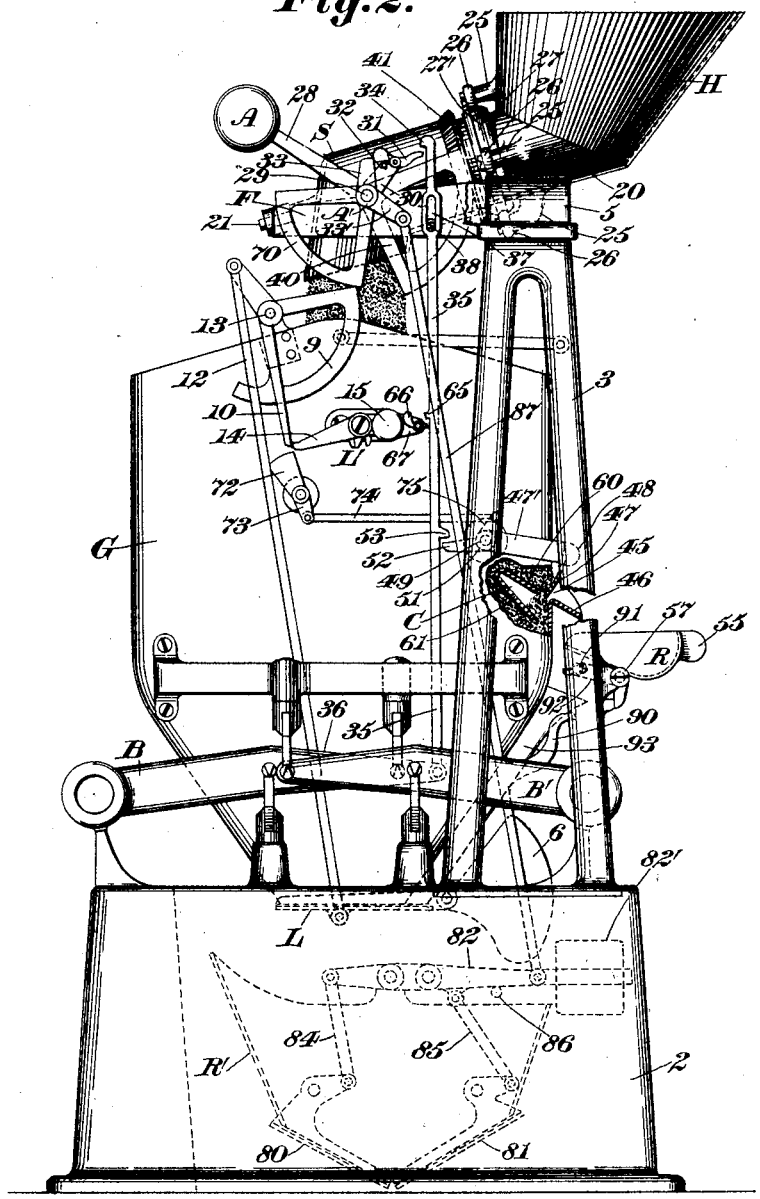
Figure 3:
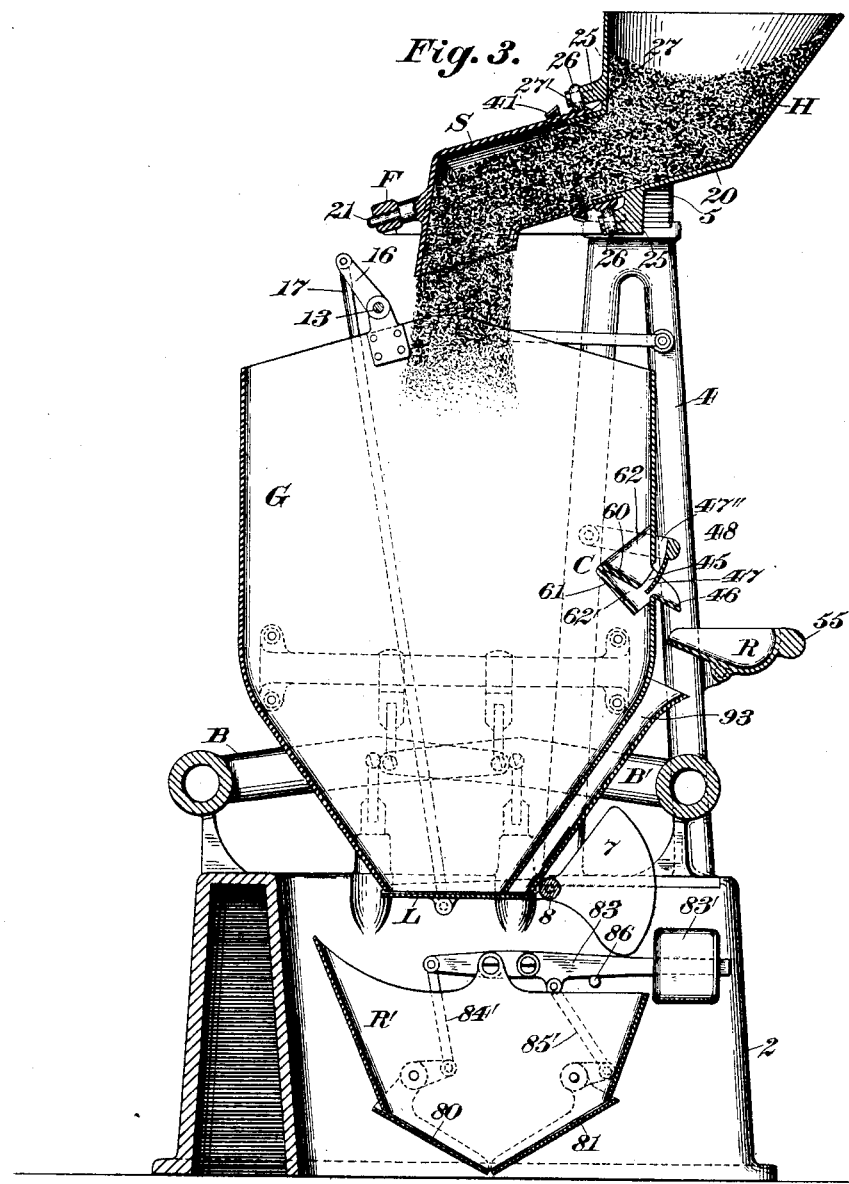
Figure 4:
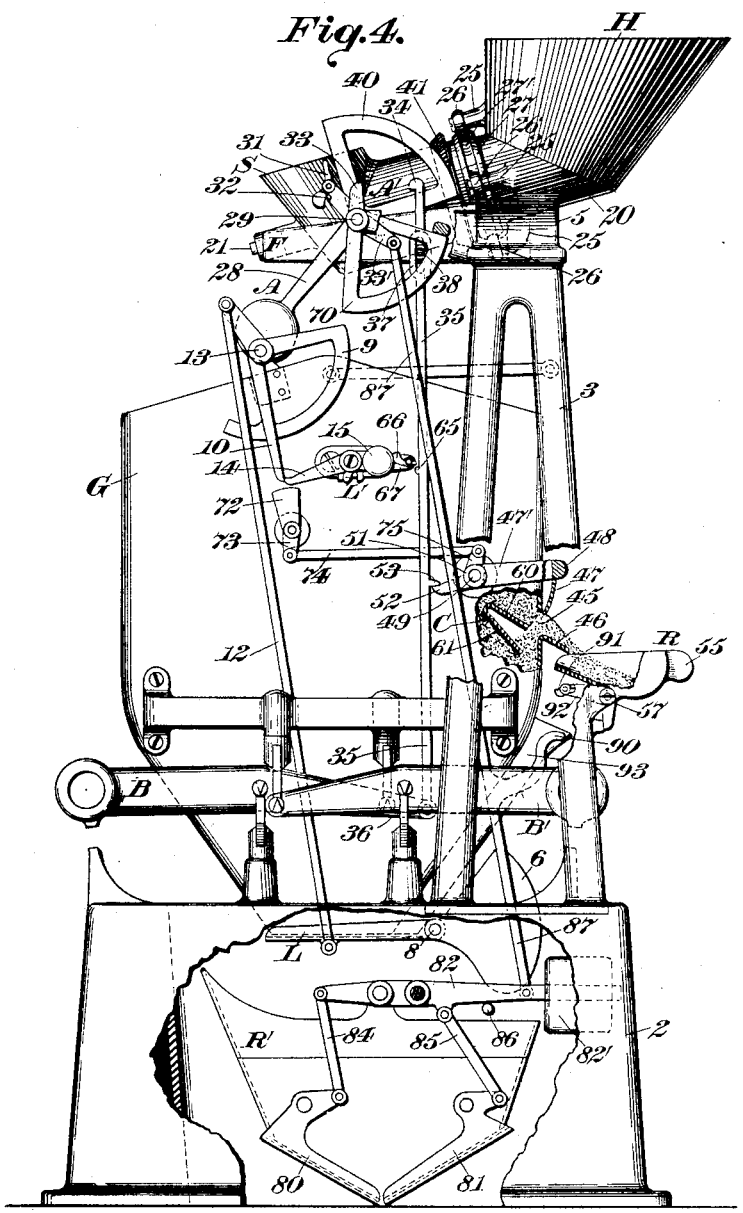
Figure 7:
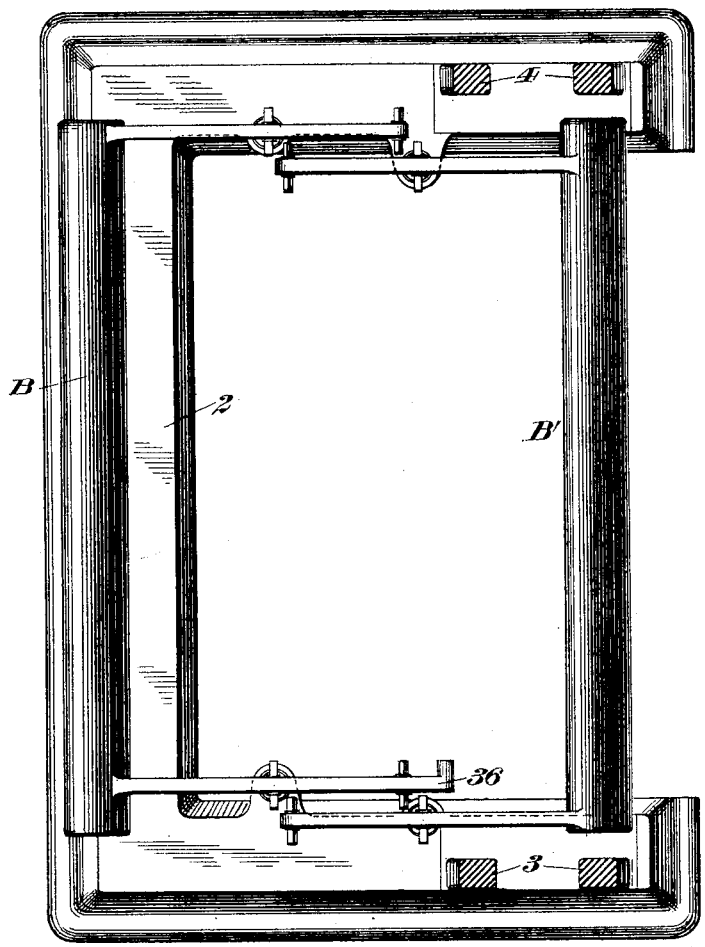

In the drawings accompanying and forming part of this specification, Figure 1 is a rear elevation of a weighing-machine embodying my present improvements, and it illustrates the positions occupied by the respective parts at the commencement of operation. Fig. 2 is an end elevation of the machine as seen from the left in Fig. 1. Fig. 3 is a longitudinal central section of the machine. Figs. 4 and 5 are views similar to Fig. 2, representing the positions occupied by the parts during the load-reducing and the load-discharging periods, respectively. Fig. 6 is a detail view of the auxiliary material-receiver, it being shown discharging its contents into the main load-receiver; and Fig. 7 is a plan view of the beam mechanism.

Similar characters designate like parts in all the figures of the drawings.

The framework for carrying the different sets of mechanisms may be of any suitable structure, and it consists in the present case of the supporting base or bed 2, the end frames or columns 3 and 4, which rise therefrom, and the top plate or beam 5, which is mounted on said end frames, said parts being connected together in some ordinary manner.

The top plate 5, at about its middle, is furnished with a substantially funnel-shaped hopper H, which may be cast therewith and which, in conjunction with the stream-controller, constitutes a suitable means for delivering the overload-supply to the load-receiver, as will hereinafter appear.

The weighing mechanism, as is usual, is made up of a suitable load-receiver and supporting-beam mechanism therefor, the latter comprising a pair of oppositely-disposed scale-beams B and B', the arms of the beam B' overlapping those of its mate.

The beams B and B' will be fulcrumed or pivotally supported upon the base and will be provided with supports for the load-receiver, which is designated by G, in the well-known manner.

The load-receiver G has the usual discharge-outlet, the efflux of material therefrom being controlled by the closer L, which consists of a flat plate pivotally supported at one side of said discharge-outlet, said closer being furnished with the preferably integral plates 6 and 7 at opposite sides thereof, which are affixed to the transverse rock-shaft 8 on the load-receiver, the office of said plates 6 and 7 being to shut the closer on the discharge of a load.

The load-discharge-controlling means includes a latch that is adapted to engage a suitable member operative with the closer, such as the arm 10 on the rocker 9, said rocker being connected with the closer L by the long rod 12 and being affixed to the transverse rock-shaft 13, that is journaled in suitable brackets on the upper edge of the load-receiver.

The latch for engaging the rocker-arm 10 is designated by L', its working arm 14 swinging upward to engage said arm through the action of the counterweight 15, the movement of said latch being preferably limited by suitable coöperating stops on the load-receiver and latch, respectively.

The shaft 13 at its end opposite to that furnished with the rocker 9 has attached thereto the crank arm 16, to the outer end of which is pivoted the rod 17, which is likewise jointed to the closer L, said rod moving in parallelism with the rod 12.

The stream-controller (see Fig. 3) is designated by S, and it consists of a cut-off spout in the form of an elbow supported for semirotative movement, it being sleeved at its inner end to the tubular spout 20 of the hopper H, said stream-controller having at its opposite end the projecting spindle 21, which is journaled in the transverse member of the auxiliary frame F, which extends forward from the top plate 5.

On an inspection of Fig. 3 the mouth of the tubular cut-off or elbow S is shown inverted, so that, it being in communication with the hopper H, a stream of comparatively large and uniform volume can gravitate into the empty load-receiver G.

On the retraction or turning of the cut-off spout or elbow S, as shown in Figs. 4 and 5, the supply of material to the load-receiver will be stopped, and I prefer to maintain the cut-off spout S in its normal or inverted position, as represented in Figs. 2 and 3, during the load-supply period, whereby the delivery of a mass of material thereto in excess of or beyond that determined upon for a true or predetermined charge can be obtained, the surplus being subsequently removed to poise the weighing mechanism and on the ascent of the latter.

The hopper has projecting forward therefrom a series of lugs, such as 25, each of which is furnished with an antifriction-roll 26, which lies in the channel or groove 27' of the annular bearing 27 on the elbow S, thereby providing not only an effective journal, but means for resisting end thrust of said elbow during the operation of the machine.

The actuator for operating the elbow S so that the supply of material can be diverted from the load-receiver at a predetermined point will be preferably held out of action or ineffective relatively thereto during the supply of the overload, a suitable detent or latch, the action of which is controlled by the weighing mechanism, being preferably employed to hold such actuator in its ineffective position.

The actuator for retracting the elbow S to divert the supply from the load-receiver is designated by A, and it consists of a comparatively large weight on the arm 28, that is fixed on the rock-shaft 29, said shaft being suitably supported by the auxiliary frame F, to which I have hereinbefore alluded.

The shaft 29 has thereon the rock-arm 30, to the upper end of which is pivoted a latch 31, the weighted or forward arm of which rests upon the pin 32 on the rock-arm 30, said latch being located to engage the coöperating arm 33, which is loose on or sleeved to the shaft 29 and which is connected with a suitable resistance member, such as the normally stationary lever 82, so that it constitutes in effect a rigid extension on the shaft 29, whereby so long as the latch 31 is in engagement therewith the large elbow-turning weight A will be held in its uppermost position. When, however, the actuator-holding latch 31 is tripped and its weighted forward arm is raised above the rock-arm 33, the actuator A will be free to drop, and in so doing, through the interposition of suitable instrumentalities, it can turn the elbow S to arrest the supply to the load-receiver.

As a means for tripping the latch 31 I conveniently employ a tripping device connected with the beam mechanism, such a tripping device being represented at 34 as the head of the rod 35, said rod being pivoted to the poising side of the arm 36 of the scale-beam B, so that when the load-receiver and the beam mechanism have passed below the poising-line with the overload the tripper 34, by engaging and depressing the free arm of the latch 31, will raise its opposite arm to release the actuator A.

The rod 35 has near its upper end the longitudinal loop 37, which embraces the guide-pin 38 on the auxiliary frame F.

The rock-shaft 29 is furnished at its inner end with driving-gear 40, which is in the form of a sector, the teeth which are on the inside face of said sector being beveled and adapted to mesh with the teeth of the bevel ring-gear 41, which is fixed near the inner end of the turning elbow S.

In Figs. 1 and 2 the elbow S is illustrated delivering the supply-stream to the load-receiver G, the actuator A being held ineffective by the latch 31, which is in engagement with the rock-arm 33 on the actuator rock-shaft 29, so that the full volume of the supply-stream can enter the load-receiver, thereby causing its descent with the beam mechanism.

When the beam mechanism has passed below the poising-line, the latch 31 will be tripped by the tripper 34, connected with the beam mechanism, so that the actuator A will be released and can drop from the position shown in Fig. 2 to that illustrated in Fig. 4, and in so doing the shaft 29 and sector-gear 40 will be rocked, whereby the elbow S will be turned to the right, Fig. 4, to stop the supply to the load-receiver, this action being a very rapid one.

When the main load-receiver passes below the poising-line, it will have an overload or a quantity of material in excess of that determined upon for a true charge, and instrumentalities for removing the surplus will be called into requisition immediately on the stoppage of the supply to the load-receiver, the excess being withdrawn through a suitable opening or recess in the load-receiver at a point between its receiving and delivery ends, such as the opening 45, below which the spout 46 on the bucket is situated, so that the material can be guided into a suitable auxiliary receptacle or reservoir, which is preferably carried by the framework of the machine.

The passage of material through the load-reducing opening 45 will be preferably regulated or governed by a valve, such as 47, which is normally located within the load-receiver to prevent the escape of material during the load-supply period, but which when retracted permits the surplus to flow from the load-receiver. Said valve, as will be noticed, is obliquely disposed, so that when thrust or inserted into the load-reducing opening 45 at the proper time it will guide the material away from the said opening and toward the discharge-outlet of the load-receiver.

The valve 47 is suitably attached to the transverse swinging bar 48, which is located at the rear of the load-receiver G, the opposite arms 47' and 47'', respectively, of said bar being pivotally supported, as by the projecting stud 49 and the pivot-screw 50, fixed to opposite sides of the load-receiver respectively.

The actuator for the load-reducing valve 47 is preferably connected with the beam mechanism, so that when the latter has reached the end of its downstroke said actuator becomes effective to retract or open said valve to permit the surplus or overload to pass from the load-receiver through the load-reducing opening 45, the spout 46 delivering the material thus withdrawn into a suitable reservoir.

The hub 51 of the arm 47' is furnished with a lug 52, disposed in the path of movement of the actuator 53 on the relatively long thrust-rod 35, which, it will be remembered, is connected with the scale-beam B.

When the weighing mechanism has nearly reached the end of its downstroke, the actuator or projection 53 will impinge against the lug 52 and will swing the valve 47 open, so that the excess can immediately flow from the load-receiver, as shown in Fig. 4, whereupon the weighing mechanism will immediately rise, so that the actuator 53 will move away from the coöperating projection or lug 52, thereby permitting the valve 47 to shut by the weight of the bar 48 and its two arms 47' and 47'', the stream from the load-receiver being cut off at the time the true charge is made, thereby stopping further withdrawal of material from the load-receiver.

The spout 46 is adapted to deliver the material removed from the receiver into the auxiliary receiver R, which consists of a tilting pan located below said spout, said receiver or pan R having a weight 55 attached thereto at the rear of its axis of movement to prevent its premature action and for also returning it to its normal position when its contents have been emptied. Said receptacle R is suitably affixed to the rock-shaft 56, which has journal-openings in its opposite ends for the reception of pivot-screws, as 57 and 58, on the end frames 3 and 4, respectively.

A plate is illustrated at C, it being located within the load-receiver G and at a point adjacent to and opposite the load-reducing opening 45, said plate being of substantially U shape, its two sections being designated, respectively, by 60 and 61, said plate having wings, as 62 and 62', at its ends, which can be attached to the inside face of the load-receiver in some suitable manner. (See Fig. 3.) The upper section 60 of the plate constitutes a guide or means for facilitating the removal of the surplus from the load-receiver to bring it to the requisite standard, the space between the two sections serving as a pocket into which the material forward of the discharge edge of the valve 47, as the latter closes, can crowd, thereby permitting the free shutting movement of said valve and of necessity the prompt cut off of material passing through the load-reducing opening 45.

The tripper for the closer-holding latch L' is designated by 65, and it consists in the present case of a projection on the rod 35, which is adapted to operate the latch on the ascending movement of the weighing mechanism, said projection coöperating with a suitable counterweighted switch or by-pass, as 66, on the ear 67 of the latch-weight 15, the weight of said by-pass resting normally upon the weight 15 of the latch.

As the weighing mechanism descends in the manner hereinbefore set forth the rod 35 will be moved in correspondence therewith, and at a certain point in the descent of said rod the projection thereon will engage and pass by the switch 66, this action being freely permitted without affecting or changing the position of the latch L'.

On the upward movement of the weighing mechanism and the rod 35 and when the surplus has been wholly removed from the load-receiver the projection 65 will engage the by-pass 66, which is held against action by the weight 15, and will raise the free arm of said latch and lower the working arm 14 thereof to disengage the latter from the coöperating arm 10 of the rocker 9, whereby the closer L will be released and can be then forced open to discharge the contents of the load-receiver G.

I provide in connection with the stream-controller S and the closer L a pair of reciprocally-effective stops, the rocker 9, to which I have hereinbefore referred, constituting one of such stops, the other, which is designated by 70, being represented as carried upon the shaft 29, and said stops in the form shown consisting of skeleton segments. Their action is clearly illustrated in Figs. 2 and 5.

In Fig. 5 the stop 9 is represented contiguous to the curved face of the coöperating member or stop 70, so that should the latch L' be tripped too soon the action of the stop 9 will be blocked by the coöperating stop 70, whereby the closer L will be held against opening movement. On the tripping of the latch 31 and the dropping of the actuator A to turn the elbow S so that the supply will be diverted from the load-receiver the stop 70 will be swung with the shaft 20 and will be carried bodily across the plane of the curved face of the stop 9, thereby releasing the latter, so that the latch L' having been tripped the closer L can be forced open, thereby rocking the stop 9 about its axis, with its curved face substantially in contact with the adjacent stop 70, whereby retractive movement of the latter, and hence the delivery of material to the load-receiver, will be precluded, this relation continuing so long as the closer is open. When said closer is shut, the stop 9 will release the companion stop 70, whereby the stream-controller S can be operated to deliver the supply-stream into the empty load-receiver.

There is represented at 72 a stop that is pivotally mounted upon the load-receiver G and consists of a segmental plate that is operative with the load-reducing valve, said plate having an arm 73, to which is pivoted the link 74, the latter in turn being connected with the rock-arm 75 on the hub of the arm 47'. During the overload period and when the valve 47 is shut the stop 72 will be located at one side of the plane of oscillation of the latch L', as represented in Fig. 2. Immediately on the opening of the load-reducing valve, however, the stop-segment 72 will be thrown under the working arm 14 of the latch, as shown in Fig. 4, whereby the depression of said arm is prevented so long as the load-reducing valve 47 is open. When the latter shuts, this action will be reversed, so that the latch L' can be tripped in the manner hereinbefore specified, and when this last-specified operation takes place the arm 14 of the latch will be contiguous to the inside straight face of the segment 72, as shown in Fig. 5, and for a short space of time, whereby the valve 47 is held from opening while the load is being discharged from the load-receiver G.

There is illustrated at R' a regulator, it being pivotally supported within the supporting-base 2, and it consists of a hopper intended to receive and to be depressed by the loads intermittingly discharged by the load-receiver, said regulator being preferably valved to insure its retention of a comparatively large quantity of material to carry the same downward.

The valves for the regulator, which are pivoted at opposite sides, are designated by 80 and 81, respectively, they fitting against the oblique lower edges of the hopper when shut, as represented in Figs. 2, 3, and 4 of the drawings.

A pair of levers are represented at 82 and 83, respectively, they being pivotally mounted on the inside of the base 2 and being likewise connected to suitable lugs or ears on the opposite sides of the regulator R'. The lever 82 is connected by the links 84 and 85, respectively, with the valves 80 and 81 of the regulator, said links being pivoted to the lever at opposite sides of its axis of movement, so that when the valves are opened the link 84 will be drawn downward and the link 85 will be forced upward to shift the lever 82 relatively to the regulator. The lever 83 is also connected by links to the valves 80 and 81, only one of said links being represented, (see Fig. 1,) it being designated by 85'. When the two levers are in their normal positions, they will be sustained by suitable stop-pins, as 86, on the base.

The lever 82 has pivoted thereto at a point between its fulcrum and free end the long rod 87, which is similarly joined to the arm 33' of the angle-lever A', it being remembered that the arm 33 of said angle-lever is normally engaged by the actuator-holding latch 31.

The two levers 82 and 83 are furnished with weights 82' and 83', respectively, which are comparatively large and which are preferably longitudinally adjustable on the respective levers.

It will be evident that by reason of the connection between the angle-lever A' and the regulator-operating lever 82 the arm 33 of said lever constitutes in effect a fixed extension on the shaft 29, to which is affixed the actuator-arm 28, it being understood that the combined mass of the weights 82' and 83' exceeds that of the actuator or weight A, so that the latter can be easily held in its ineffective position during the supply of the overload.

The actuator-latch 31 having been tripped by the beam mechanism the actuator A will drop from the position illustrated in Fig. 2 to that indicated in Fig. 4, so that the elbow S can be turned to divert the supply-stream from the load-receiver, and the closer-latch L' having been tripped the closer L will be forced open to permit the contents of the load-receiver to enter the regulator-hopper R', thereby depressing the latter and simultaneously forcing the valves 80 and 81 thereof open or apart, so that the levers 82 and 83 can be shifted relatively to the regulator. As this takes place the rod 87 will be thrust upward and the angle-lever A' turned about the rock-shaft 29, the arm 33 of said angle-lever being carried against and forcing the latch 31 to one side, so that said arm can pass under the weight of said latch, as shown in Fig. 5.

When the material has passed from the regulator and below the discharge edges of the valves thereof, said regulator will be raised and the valves will be shut, the levers 82 and 83 simultaneously dropping and the first-mentioned pulling the rod 87 down to reverse the action of the angle-lever A', whereby the actuator A can be reset or returned to its normal position by the arm 33, which is under and in engagement with the latch 31, at which time the sector 40 is semirotated, and being in mesh with the ring-gear 41 the elbow S will be turned to deliver the supply-stream into the load-receiver G.

For the purpose of emptying the auxiliary receiver R, I prefer to employ means operative with the regulator R' as the latter returns to its normal position or ascends after the material that is discharged thereinto from the bucket has passed therefrom.

The rod 87 has affixed thereto the arm 90, which on the descent of the regulator R is elevated, said arm on such movement engaging the by-pass, as 91, of usual construction, on the arm 92, that extends forward from the shaft 56 of the receptacle R without affecting the position of said receptacle.

On the downstroke of the rod 87 as the hopper rises the arm 90 will engage the by-pass 91, which is practically at this time a fixed part of the rock-arm 92, so that on the slight continuation of such movement the receptacle will be tilted, as shown in Fig. 6, to empty its contents into the load-receiver to form the first part of a new load.

For the purpose of receiving the material discharged by the auxiliary receiver R, I provide the conduit 93 on the load-receiver open at both of its ends, the inlet-opening of said conduit being located adjacent to the auxiliary receiver R and the outlet-opening of said conduit being covered by the closer when the latter is shut. On the opening of the closer L on the completion of the load the material within the conduit 93 will readily gravitate therefrom, as will be understood.

The operation of the hereinbefore-described weighing-machine, briefly stated, is as follows: Figs. 2 and 3 represent the positions occupied by the parts at the commencement of operation, the closer L being shut and held in such position by the latch L', which is in engagement with the arm 10 of the rocker 9, and the elbow S being inverted a stream of large volume can enter the load-receiver to overload the same, so that it will be carried below the so-called "poising-line." When the weighing mechanism is overloaded, the head or tripper 34 on the relatively long rod 35 will engage the free arm of the latch 31 to trip the same, so that the actuator A will be released and can drop, said actuator being operable, through the intervention of the hereinbefore-described instrumentalities, for advancing or turning the elbow S to divert the stream from the load-receiver. When the load-receiver has reached the end of its downward movement, the projection 53 on the rod 35 will engage the lug 52, that is operative with the load-reducing valve 47, to retract or raise the latter, so that the surplus can be removed from the load-receiver, the material thus withdrawn being delivered to the auxiliary receiver R. When the material is removed, the load-receiver will rise, whereby the valve 47 can be shut. On the downstroke of the rod 35 the tripper 65 thereon will engage and pass by the switch 66 on the latch L', as shown in Fig. 4. On the upstroke of the rod with the lightened load-receiver said projection will engage the switch and will trip the latch L' at the time the true charge is in the load-receiver to thereby release the closer L. When the closer L is released, it will be forced open by the weight of the load in the load-receiver G, such load being discharged into the regulator-hopper R' to depress the same. When the material passes below the discharge edge of the closer L, the latter will be shut by its counterweighted plates 6 and 7. When the load is received by the regulator R', it will depress the same. The material when it passes from said regulator will permit the latter to rise, and on the ascent of the regulator the contents of the auxiliary receiver R will be emptied therefrom in the manner hereinbefore set forth, and the other parts of the weighing mechanism will be returned to their normal position.

Having described my invention, I claim—

1. The combination, with weighing mechanism embodying a load-receiver, of a rotative tubular cut-off in position to deliver a stream of material to the load-receiver; means for holding said cut-off spout in its normal position until the load-receiver is overloaded; means controlled by the weighing mechanism for imparting a one-half rotation to said spout on the descent of the load-receiver, thereby to stop the supply of material thereto; and means mounted on the load-receiver for effecting the removal of the surplus supplied by the spout.

2. The combination, with weighing mechanism embodying a load-receiver, of a tubular cut-off spout; an actuator controlled by the weighing mechanism, for partially rotating said spout in one direction; a regulator positioned to receive the contents discharged from the load-receiver; and a device connected with the regulator, for partially turning said spout in the opposite direction.

3. The combination, with weighing mechanism embodying a load-receiver, of a hopper; a rotative elbow cut-off communicating with said hopper; means for holding the cut-off in its normal position for a predetermined length of time or until the load-receiver has received a supply of material in excess of the predetermined load; means controlled by the weighing mechanism for imparting a one-half rotation to said cut-off on the descent of the load-receiver; and load-reducing means mounted on said load-receiver for effecting the removal of the surplus supplied by said cut-off.

4. The combination, with weighing mechanism embodying a load-receiver, of a hopper; a rotative elbow cut-off communicating with said hopper; and means connected with the weighing mechanism for imparting a one-half rotation to said spout on the descent of the load-receiver and for imparting an opposite one-half rotation to the cut-off when the load-receiver is in position to receive the supply-stream.

5. The combination, with weighing mechanism embodying a load-receiver, of a hopper; a cut-off spout sleeved to said hopper; a regulator positioned for receiving the contents discharged from the load-receiver; means coöperative with the weighing mechanism, for partially rotating said cut-off spout in one direction; and means connected with the regulator, for partially rotating said spout in the opposite direction.

6. The combination, with a load-receiver, of a regulator positioned to receive the contents discharged by the load-receiver; a stream-controller; an actuator for said stream-controller; a latch coöperative with the stream-controller and positioned to engage a normally stationary device connected with the regulator, for holding the actuator ineffective; and means for tripping said latch whereby the actuator is rendered effective for operating the stream-controller.

7. The combination, with weighing mechanism embodying a load-receiver, of a hopper; a spout sleeved to said hopper and having thereon a ring provided with a channel; a series of projections on the hopper, provided with antifriction devices lying in said channel; a spindle on said spout, journaled in the framework; and means controlled by the weighing mechanism, for turning said spout.

8. The combination, with weighing mechanism embodying a load-receiver, of a hopper; a rotative spout sleeved to said hopper; an actuator for operating said spout; a latch connected to said actuator and normally engaging a fixed part to hold the actuator ineffective; and means operative with the weighing mechanism for tripping said latch.

9. The combination, with a load-receiver, of a scale-beam for supporting the same; a hopper; a spout sleeved to said hopper; a shaft carrying an actuator for the spout; a regulator positioned to receive the contents discharged from the load-receiver; a latch connected with said actuator and adapted to engage a normally stationary part connected with the regulator, thereby to hold the actuator ineffective; and a tripper for said latch.

10. The combination, with weighing mechanism embodying a load-receiver, of a hopper; a rotative elbow-spout sleeved on said hopper; a shaft; an actuator secured to said shaft; a latch connected with the actuator and in position to engage a relatively-fixed part, thereby to hold the actuator ineffective; and means connected with the weighing mechanism for tripping said latch.

11. The combination, with weighing mechanism embodying a load-receiver, of a spout; meshing gears secured, respectively, with the shaft and spout; an actuator mounted on said shaft; a latch connected with the actuator and adapted to engage a normally stationary part; and means controlled by the weighing mechanism, for tripping said latch.

12. The combination, with weighing mechanism embodying a load-receiver, of a hopper; a tubular spout communicating with said hopper; a ring-gear on said spout; a shaft having a gear meshing with said ring-gear and also having an arm provided with a weight; and means for normally holding said weight out of action.

13. The combination, with weighing mechanism embodying a load-receiver, of a hopper; a spout communicating with said hopper; a regulator positioned to receive the contents discharged from the load-receiver; a shaft carrying an actuator for the spout and also having an arm provided with a latch; and a member loose on said shaft, said member being located to be engaged by the latch and being connected with the regulator.

14. The combination, with weighing mechanism embodying a load-receiver, of a hopper; a spout communicating with said hopper; a regulator positioned to receive the contents discharged from the load-receiver; a shaft coöperating with said spout and having an angle-lever thereon connected with the regulator; and an actuator carried by said shaft and having an arm operative therewith that is provided with a latch, said latch being situated to engage the angle-lever.

15. The combination, with a load-receiver, of a regulator-hopper situated to receive the contents thereof and having a pair of valves; a lever connected with said regulator; and a pair of links jointed, respectively, to the lever and the valves of the regulator; said links being attached to the lever at opposite sides of its connection with the regulator.

16. The combination, with weighing mechanism embodying a load-receiver, of a hopper; a spout communicating with said hopper; an actuator for turning said spout in one direction; and a regulator located to receive the contents discharged from the load-receiver and having a device connected therewith for turning said spout in the opposite direction.

17. The combination, with weighing mechanism embodying a load-receiver provided with a closer, of a hopper; a spout communicating with said hopper; a shaft; gearing secured, respectively, to said shaft and the spout; an actuator mounted on said shaft; an interlocking stop also mounted on said shaft; a coöperating interlocking stop connected with the closer; a latch coöperative with the actuator and adapted to engage a normally stationary part; and a tripping device for said latch.

18. The combination, with weighing mechanism embodying a load-receiver, of a valved regulator-hopper; a lever connected with the valve of said hopper; a stream-controller; and means connected with said lever, for turning said spout in one direction.

19. The combination, with weighing mechanism embodying a load-receiver, of a valved regulator-hopper situated to receive the contents discharged from the load-receiver; a weighted lever mounted on the framework and connected with the valve for said regulator; a stream-controller; and means connected with said lever, for operating the stream-controller.

20. The combination, with weighing mechanism embodying a load-receiver, of a valved regulator-hopper located to receive the contents discharged from said load-receiver; a spout; an actuator for turning said spout; a shaft carrying said actuator and having a member loose thereon; a lever connected with the valves of the regulator; a rod pivoted, respectively, to said member and the lever; and an arm on said shaft, provided with a latch located to engage said member.

21. The combination, with weighing mechanism comprehending a load-receiver, of load-discharge-controlling means embodying a latch; overloading and load-reducing means, the overloading means including a stream-controller and the load-reducing means including a valve; an actuator for said stream-controller; a latch normally adapted to hold said actuator out of action; and a rod connected with the weighing mechanism and having three projections, two of which are adapted to successively trip the actuator-holding and load-discharge-controlling latches, and the third of which is adapted to open the load-reducing valve at a stage between the tripping of said latches.

22. The combination, with weighing mechanism embodying a load-receiver having an opening to permit the removal of material from the load-receiver before the discharge of a load; and an obliquely-disposed valve controlling the efflux of material from said opening, said valve having a movement into the load-receiver; and valve-actuating means.

23. The combination, with weighing mechanism embodying a load-receiver having a load-reducing opening, of overloading means; an obliquely-disposed valve having a movement through said opening into the load-receiver; and valve-actuating means.

24. The combination, with weighing mechanism embodying a load-receiver having an opening to permit the removal of material from the load-receiver before the discharge of a load, of an obliquely-disposed valve controlling the efflux of material through said opening, said valve having a movement into the load-receiver; and a spout situated adjacent to said opening to deliver the material removed from the load-receiver into a suitable receptacle.

25. The combination, with a load-receiver having a load-reducing opening; of a plate within the load-receiver, supported adjacent to said opening and consisting of two inclined sections, one of which is adapted to guide material from the load-receiver toward said opening, and said sections being so disposed that a pocket is formed between the same.

26. The combination, with weighing mechanism embodying a load-receiver having an opening; of a plate situated within the load-receiver, adjacent to said opening and consisting of two inclined sections the uppermost situated to guide material to said opening, the space between said sections constituting a pocket; and a valve for said opening.

27. The combination, with weighing mechanism embodying a main load-receiver, of means for removing material from the main load-receiver before the discharge of the load; and a movably-mounted surplus-receiver located to receive said material.

28. The combination, with weighing mechanism embodying a main load-receiver, of overloading and load-reducing means operative in such order during the weighing of a load; and a movably-mounted surplus-receiver located to receive the material removed from the main load-receiver.

29. The combination, with weighing mechanism embodying a main load-receiver, of means for removing material from said main load-receiver before the discharge of the load; a movably-mounted surplus-receiver located to receive the material withdrawn from the main load-receiver; and means for emptying said surplus-receiver into the main load-receiver subsequent to the discharge of a load by the latter.

30. The combination, with weighing mechanism embodying a main load-receiver, of a regulator positioned to receive the contents discharged from the main load-receiver; a surplus-receiver; means for removing the material from the main load-receiver and delivering it to the surplus-receiver; and means for emptying said surplus-receiver, said means being operative with the regulator.

31. The combination, with weighing mechanism embodying a main load-receiver, of a regulator positioned to receive the contents discharged from the load-receiver; a movably-mounted surplus-receiver; means for removing the material from the main load-receiver and for delivering the same to the surplus-receiver; and means for emptying said surplus-receiver, said means being operative with the regulator.

32. The combination, with weighing mechanism embodying a load-receiver having a load-reducing opening, of a valve for said opening; a shaft carrying said valve, said shaft being furnished with arms, the head of one of which is equipped with a rock-arm; load-discharge-controlling means including a latch; a segment on the load-receiver; and a link pivoted, respectively, to said segment and the rock-arm.

FRANCIS H. RICHARDS.

Witnesses:
FRED. J. DOLE,
F. N. CHASE.